United States Patent [19]
Gleason et al.

[11] Patent Number: 5,805,652
[45] Date of Patent: Sep. 8, 1998

[54] APPARATUS AND METHODS FOR REPLACING JET PUMP DIFFUSERS IN A NUCLEAR REACTOR

[75] Inventors: Thomas Edaward Gleason, Monte Sereno; Gerald Alan Deaver; Barry Hal Koepke, both of San Jose, all of Calif.

[73] Assignee: General Electric Company, Schenectady, N.Y.

[21] Appl. No.: 684,680

[22] Filed: Jul. 19, 1996

[51] Int. Cl.[6] .................................................. G21C 15/25
[52] U.S. Cl. ............................................ 376/260; 376/372
[58] Field of Search .................................. 376/260, 352, 376/372, 392, 407

[56] References Cited

U.S. PATENT DOCUMENTS 5,583,899  12/1996  Relf .......................................... 376/372

Primary Examiner—Daniel D. Wasil
Attorney, Agent, or Firm—Armstong, Teasdale, Schlafly & Davis

[57] ABSTRACT

A replacement jet pump diffuser apparatus and method are described. In one embodiment, the replacement diffuser apparatus includes a conical section, a first cylindrical section, and a second cylindrical section. The conical section is welded to the first cylindrical section, and the first cylindrical section is welded to the second cylindrical section. A V-flange is formed at one end of the second cylindrical section. The assembly further includes an adapter having a V-flange formed at one end. The adapter is secured to the second cylindrical section by a band clamp which compresses the V-flanges into contact. The adapter further includes an engagement flange having a plurality of bores extending therethrough. L-bolts extend through the respective bores in the engagement flange, and each L-bolt includes an L-section and a threaded section. Respective nuts threadedly engage the threaded sections of the L-bolts. The L-section of each bolt contacts a lower surface of the shroud support plate.

20 Claims, 2 Drawing Sheets

5,805,652

APPARATUS AND METHODS FOR REPLACING JET PUMP DIFFUSERS IN A NUCLEAR REACTOR

FIELD OF THE INVENTION

This invention relates generally to jet pump diffusers in nuclear reactors and, more particularly, to apparatus and methods for replacing such diffusers.

BACKGROUND OF THE INVENTION

Jet pump diffusers in a nuclear reactor, such as in a boiling water nuclear reactor, typically form part of a jet pump and are utilized to maintain the floodability of the reactor core at a safe level. The jet pump diffuser also typically discharges water from an inlet mixer into the lower core plenum to maintain adequate recirculation flow.

One known jet pump diffuser has a generally conical shape, and the larger diameter end of the diffuser is welded to an adapter assembly engaged to an inconel shroud support plate. The smaller diameter end of the diffuser forms a slip fit connection to the inlet mixer section of the jet pump.

Water, generally under high pressure, flows through the jet pump diffuser from the smaller diameter end to the larger diameter end. The water exits the diffuser at the larger diameter end and is discharged through the adapter assembly into the lower core plenum. The discharged water mixes with the water in the lower core plenum and may cycle through the reactor.

As the water flows through the jet pump diffuser, the speed of the water decreases due to the increasing diameter of the diffuser. Decreasing the water speed and pressure just prior to discharging the water into the lower core plenum improves the mixing and flow characteristics of the discharged water.

Of course, the integrity of the welds in the jet diffuser and adapter assembly is important. A crack or corrosion in such a weld, for example, if unrepaired, could lead to further damage and eventually result in reduced jet pump flow. Therefore, jet pump welds may be inspected during reactor shutdown to ensure the integrity of such welds.

In the event that crack indications are ever found in a diffuser, the diffuser may have to be replaced. Known diffusers, however, are installed during reactor construction and are too large to be removed through the upper annulus region of the reactor. In addition, and in at least one known reactor, the annulus between the upper shroud and the inner diameter of the pressure vessel is several inches smaller than the diffuser and prevents replacement of an existing diffuser with a similar diffuser. Constructing a diffuser in the reactor by welding also is complicated due to the general difficulty in accessing the work area adjacent the diffusers and by the very limited working space at that location.

It would be desirable to provide a replacement jet pump diffuser which enables easy and simple replacement of an existing diffuser. It also would be desirable to provide such a replacement diffuser which does not jeopardize plant performance and has a reasonable cost.

SUMMARY OF THE INVENTION

These and other objects are attained by a replacement jet pump diffuser assembly which, in one embodiment, includes a conical section, a first cylindrical section, and a second cylindrical section. As compared to an existing diffuser, and at each elevation, the replacement diffuser generally has a smaller diameter than the existing diffuser. The conical section is welded to the first cylindrical section, and the first cylindrical section is welded to the second cylindrical section. A V-flange is formed at one end of the second cylindrical section. The assembly further includes an adapter having a V-flange formed at one end. The adapter is secured to the second cylindrical section by a band clamp which compresses the V-flanges into contact. The adapter further includes an engagement flange having a plurality of bores extending therethrough. L-bolts extend through the respective bores in the engagement flange, and each L-bolt includes an L-section and a threaded section. Respective nuts threadedly engage the threaded sections of the L-bolts above the flange. The L-section of each bolt contacts a lower surface of the shroud support plate.

With respect to using the above described diffuser assembly to replace an existing diffuser, the existing diffuser (including its adapter) is cut-out and removed from the reactor. Once the existing diffuser has been removed, the opening in the shroud support plate is machined to be substantially smooth and to include a machined portion. Then, the adapter is delivered sideways through the narrow annulus region between the upper shroud and the inner diameter of the pressure vessel, and the adapter is rotated into position with respect to shroud support plate. Once in position, the nuts engaged to the L-bolts are tightened so that the L-sections of the L-bolts firmly engage the lower surface of the shroud support plate. The conical section, the first cylindrical section, and the second cylindrical section of the diffuser assembly are pre-assembled, i.e., welded, and are then lowered into position so that the respective V-flanges of the second cylindrical section and of the adapter are aligned. The band clamp is then secured to compress the respective V-flanges into firm contact.

The replacement diffuser assembly described above provides the advantage that an existing diffuser can be replaced relatively easily and quickly as compared to using alternative replacement structures. In addition, the diffuser assembly is not believed to jeopardize plant performance and has a reasonable cost.

DETAILED DESCRIPTION OF THE DRAWINGS

Figure 1:
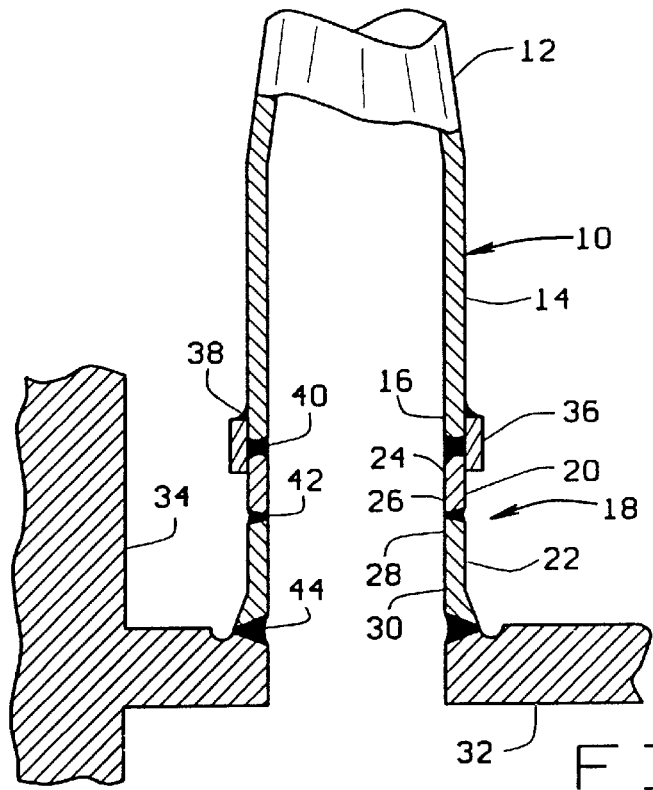
FIG. 1 is a cross sectional view of a known jet pump diffuser.

FIG. 1 is a cross sectional view of one known jet pump diffuser 10 which includes a conical section 12 and a cylindrical section 14. A larger diameter end 16 of diffuser 10 is welded to an adapter assembly 18 which includes a first adapter 20 and a second adapter 22. First adapter 20 is welded at one end 24 to end 16 of diffuser 10, and adapter 20 is welded at its other end 26 to one end 28 of second adapter 22. Second adapter 22 is welded at its other end 30 to an inconel shroud support plate 32 which extends between a vessel wall 34 and a core shroud (not shown). The smaller diameter end (not shown) of diffuser 10 forms a slip fit connection to the inlet mixer section (not shown) of the jet pump. A backing ring 36 is shown as extending around the circumference of diffuser 10 and first adapter 20 at the weld location.

Diffuser 10 is constructed from 304 stainless steel. First adapter 20 is constructed from 304 stainless steel, and second adapter 22 is constructed from alloy 600. The various welds 38, 40, 42 and 44 maintain diffuser 10 and adapter assembly 18 in an operable position so that water may flow therethrough. Weld 38 is a continuous fillet weld. Welds 40 and 42 are V-groove type welds. The filler in weld 40 is E308 stainless steel weld filler material. Welds 42 and 44 are full penetration welds with alloy 182 weld filler material. Diffuser 10 is utilized, for example, in boiling water nuclear reactors generally referred to as the General Electric Company BWR 3 and 4 type reactors.

Figure 2:
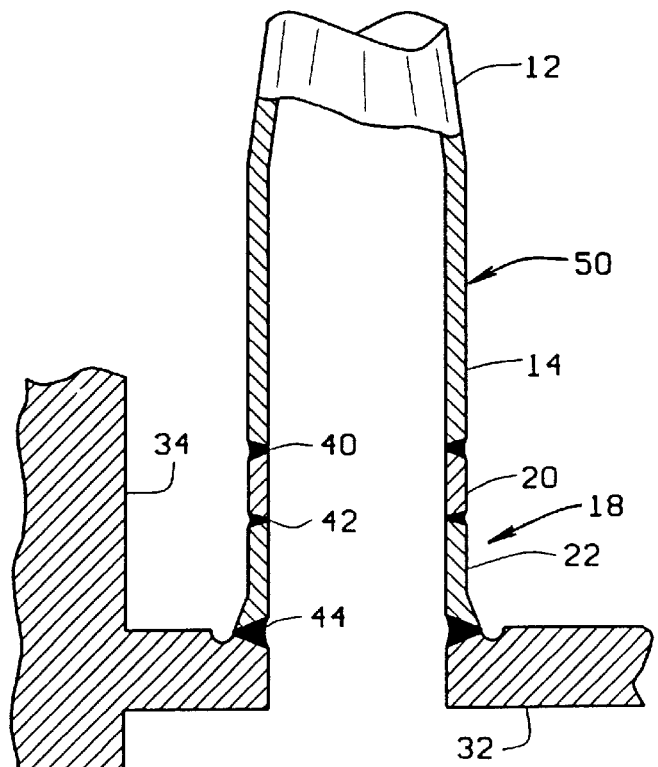
FIG. 2 is a cross sectional view of another known jet pump diffuser.

Another known diffuser 50 is shown in FIG. 2. Diffuser 50 is substantially similar to diffuser 10 shown in FIG. 1, and components and welds of diffuser 50 which are the same as the components and welds in diffuser 10 are designated in FIG. 2 using the same reference numerals as used in FIG. 1. No backing ring is utilized in diffuser 50. Diffuser 50 is utilized, for example, in the boiling water nuclear reactor generally referred to as the General Electric Company BWR 5 and 6 type reactors.

With respect to both diffusers 10 and 50, and adapter assembly 18, the weld connections described above are important. For example, if a significant crack or corrosion were to form in one of the welds, jet pump flow could be reduced due to leakage flow through the crack. Such a condition is undesirable. In addition, undesirable leakage flow could occur if cracking occurs in critical diffuser structural areas. In the event that such cracking is observed, the diffuser should be replaced.

Figure 3:
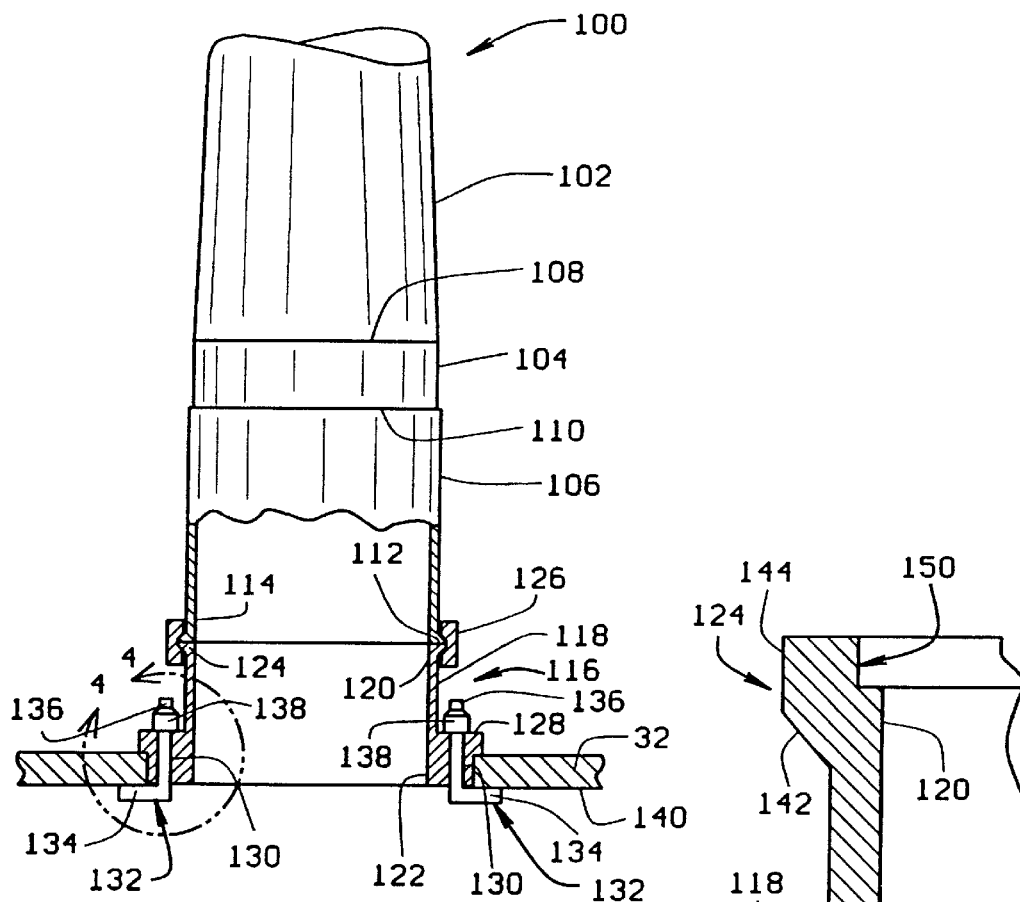
FIG. 3 is a partial cross section view of a jet pump diffuser in accordance with embodiment of the present invention.

One embodiment of a replacement diffuser assembly 100, which may be utilized if crack indications are ever found in one or more of the welds described above, is illustrated in FIG. 3. More specifically, FIG. 3 is a partial cross section view of a replacement jet pump diffuser assembly 100 in accordance with one embodiment of the present invention. Diffuser assembly 100 includes a conical section 102, a first cylindrical section 104, and a second cylindrical section 106. Conical section 102 is welded to first cylindrical section 104 by a continuous fillet weld 108 and first cylindrical section 104 is welded to second cylindrical section 106 by a continuous fillet weld 110. A V-flange 112 is formed at an end 114 of second cylindrical section 106.

Assembly 100 further includes an adapter 116 having substantially cylindrical main body portion 118 having a first end 120 and a second end 122. A V-flange 124 is formed at first end 120. Adapter 116 is secured to second cylindrical section 106 by a band clamp 126 which compresses V-flanges 112 and 124 into contact. Adapter 116 further includes an engagement flange 128 at second end 122. Flange 128 has a plurality of bores 130 extending therethrough. L-bolts 132 extend through respective bores 130, and each L-bolt 132 includes an L-section 134 and a threaded section 136. Respective nuts 138 threadedly engage threaded sections 136 of bolts 132. L-section 134 of each bolt 132 contacts a lower surface 140 of shroud support plate 32.

Conical section 102, first cylindrical section 104, second cylindrical section 106, and band clamp 126 are constructed from 304 stainless steel. Adapter 116 is constructed from alloy 600.

Figure 4:
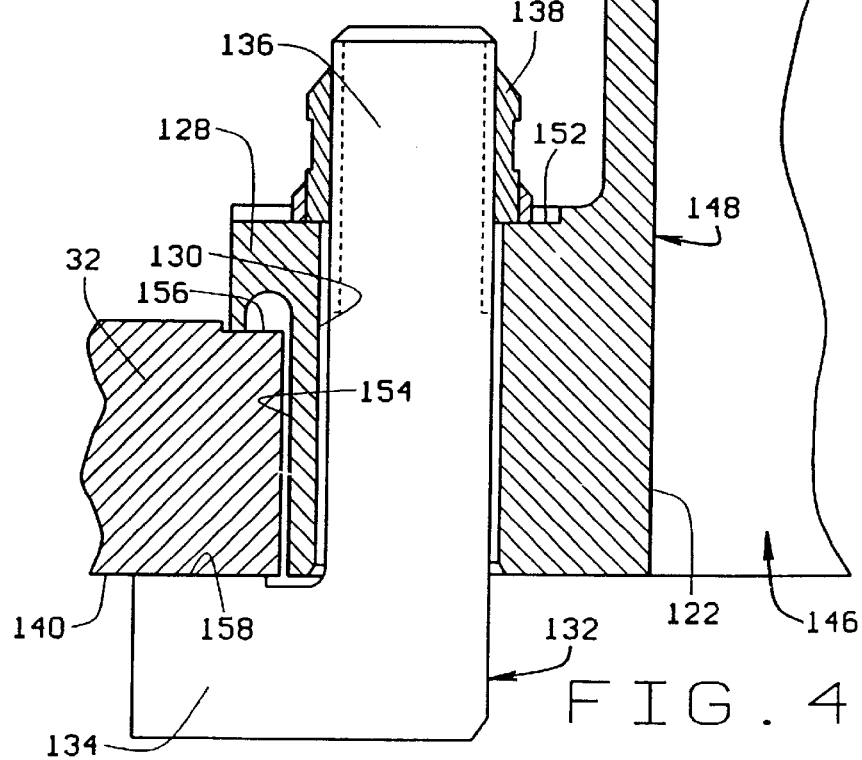
FIG. 4 is a cross section view through line 4—4 shown in FIG. 3.

FIG. 4 is a cross section view through line 4—4 shown in FIG. 3 and illustrates adapter 116 in more detail. With respect to V-flange 124, and as shown in FIG. 4, such flange 124 includes an angled section 142 and a substantially straight section 144. Also, a bore 146 extending through adapter 116 has a first section 148 and a second section 150. The outer diameter of first section 148 is less than the outer diameter of second section 150.

In addition, and with respect to engagement flange 128, a recess 152 is formed therein for receiving a portion of nut 138. Flange 128 also includes a cut-out portion 154 for interfacing with a portion of shroud support plate 32. Shroud support plate 32 is illustrated in FIG. 4 as including a machined portion 156, and flange 128 makes contact with portion 156. L-section 134 of bolt 132 includes a contact surface 158 which firmly contacts lower surface 140 of shroud support plate 32.

With respect to using diffuser assembly 100 to replace an existing diffuser, the existing diffuser (including its adapter) is cut-out and removed from the reactor. Removal of an existing diffuser is not the subject of this invention. An existing diffuser can be removed, for example, by cutting the diffuser into several sections and then lifting the sections out of the reactor through access openings in the reactor pressure vessel.

In any event, once the existing diffuser has been removed, the remaining opening in shroud support plate 32 is machined to be substantially smooth and to include machined portion 156. Then, adapter 116 is delivered sideways through the narrow annulus region between the upper shroud and the inner diameter of the pressure vessel, and adapter 116 is rotated into position with respect to shroud support plate 32, i.e., into the position shown in FIG. 4. Once in position, nuts 138 are tightened so that L-sections 134 of L-bolts 132 firmly engage lower surface 140 of plate 32.

Conical section 102, first cylindrical section 104, and second cylindrical section 106 are pre-assembled, i.e., welded, and are then lowered into position so that V-flanges 112 and 124 are aligned as shown in FIG. 3. Such sections 102, 104 and 106 have smaller diameters than the diameters at similar elevations in existing diffusers and such sections 102, 104 and 106 fit through the upper annulus. Sections 102, 104 and 106 have diameters substantially similar to the smaller diameter BWR 6 diffusers. Band clamp 126 is then secured to compress V-flanges 112 and 124 into firm contact.

Replacement diffuser assembly 100 described above provides the advantage that an existing diffuser can be replaced relatively easily and quickly as compared to using alternative replacement structures. In addition, diffuser assembly 100 is not believed to jeopardize plant performance and has a reasonable cost.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A replacement diffuser assembly for being secured to a shroud support plate in a nuclear reactor, the shroud support plate having at least one opening extending therethrough, said assembly comprising:
   a conical section,
   a first cylindrical section, one end of said first cylindrical section connected to said conical section,
   a second cylindrical section, one end of said second cylindrical section connected to one end of said first cylindrical section, a V-flange formed at another end of said second cylindrical section, and an adapter comprising a substantially cylindrical main body portion, a V-flange at one end of said main body portion and an engagement flange at another end of said main body portion, said engagement flange having a plurality of bores extending therethrough.

2. A replacement diffuser assembly in accordance with claim 1 further comprising a plurality of L-bolts extending through respective bores in said engagement flange, each L-bolt comprising an L-section and a threaded section, respective nuts threadedly engaged to said threaded sections of said L-bolts, said L-sections of said bolts contacting a lower surface of the shroud support plate.

3. A replacement diffuser assembly in accordance with claim 1 further comprising a band clamp compressing said V-flanges of said second cylindrical section and said adapter into contact.

4. A replacement diffuser assembly in accordance with claim 1 wherein said conical section is welded to said first cylindrical section and said first cylindrical section is welded to second cylindrical section.

5. A replacement diffuser assembly in accordance with claim 1 wherein said V-flange of said adapter comprises an angled section and a substantially straight section.

6. A replacement diffuser assembly in accordance with claim 5 wherein said adapter further comprises a bore extending therethrough, said bore comprising a first section and a second section, an outer diameter of said first bore section being less than an outer diameter of said second bore section.

7. A replacement diffuser assembly in accordance with claim 1 wherein said engagement flange of said adapter comprises a recess formed therein for receiving a portion of said nut.

8. A replacement diffuser assembly in accordance with claim 1 wherein said engagement flange of said adapter comprises a cut-out portion for interfacing with a portion of the shroud support plate.

9. An adapter for securing a diffuser to a shroud support plate in a nuclear reactor, the shroud support plate having at least one opening extending therethrough, said adapter comprising a substantially cylindrical main body portion having a first end and a second end, a V-flange at said first end of said main body portion, and an engagement flange at said second end of said main body portion, said engagement flange having a plurality of bores extending therethrough.

10. An adapter in accordance with claim 9 further comprising a plurality of L-bolts extending through respective bores in said engagement flange, each L-bolt comprising an L-section and a threaded section, respective nuts threadedly engaged to said threaded sections of said L-bolts, said L-sections of said bolts configured to contact a lower surface of the shroud support plate.

11. An adapter in accordance with claim 9 wherein the diffuser includes a cylindrical section having a V-flange formed at one end thereof, and said adapter further comprises a band clamp for compressing said V-flange of said adapter into contact with the V-flange of the diffuser cylindrical section.

12. An adapter in accordance with claim 9 wherein said V-flange comprises an angled section and a substantially straight section.

13. A adapter in accordance with claim 9 further comprising a bore extending through said main body portion, said bore comprising a first section and a second section, an outer diameter of said first bore section being less than an outer diameter of said second bore section.

14. An adapter in accordance with claim 9 wherein said engagement flange comprises a recess formed therein for receiving a portion of said nut.

15. An adapter in accordance with claim 9 wherein said engagement flange comprises a cut-out portion for interfacing with a portion of the shroud support plate.

16. A method for securing an adapter to a shroud support plate of a nuclear reactor, the shroud support plate having at least one opening extending therethrough, the adapter including a substantially cylindrical main body portion having a first end and a second end, a V-flange at the first end of the main body portion, and an engagement flange at the second end of the main body portion, the engagement flange having a plurality of bores extending therethrough, a plurality of L-bolts extending through respective bores in the engagement flange, each L-bolt comprising an L-section and a threaded section, respective nuts threadedly engaged to the threaded sections of the L-bolts, the L-sections of the bolts configured to contact a lower surface of the shroud support plate, said method comprising the steps of:

at least partially inserting the adapter into the opening in the shroud support plate; and tightening the respective L-bolt nuts so that the L-sections of the respective L-bolts firmly contact the lower surface of the shroud support plate.

17. A method in accordance with claim 16 further comprising the step of securing a substantially cylindrical member to the first end of the adapter.

18. A method in accordance with claim 17 wherein the substantially cylindrical member has a V-flange located at a first end thereof, and securing a substantially cylindrical member to the first end of the adapter comprises the steps of located the respective V-flanges of the cylindrical member and adapter to be substantially adjacent, and compressing the V-flange of the adapter into contact with the V-flange of the cylindrical member.

19. A method in accordance with claim 18 wherein the V-flange of the adapter is compressed into contact with the V-flange of the cylindrical member using a band clamp.

20. A method in accordance with claim 16 further comprising the step of machining the surface of the shroud support plate at the location of the shroud support plate opening.

* * * * *